March 4, 1952 R. A. MUELLER 2,588,149
VALVE
Original Filed April 8, 1944
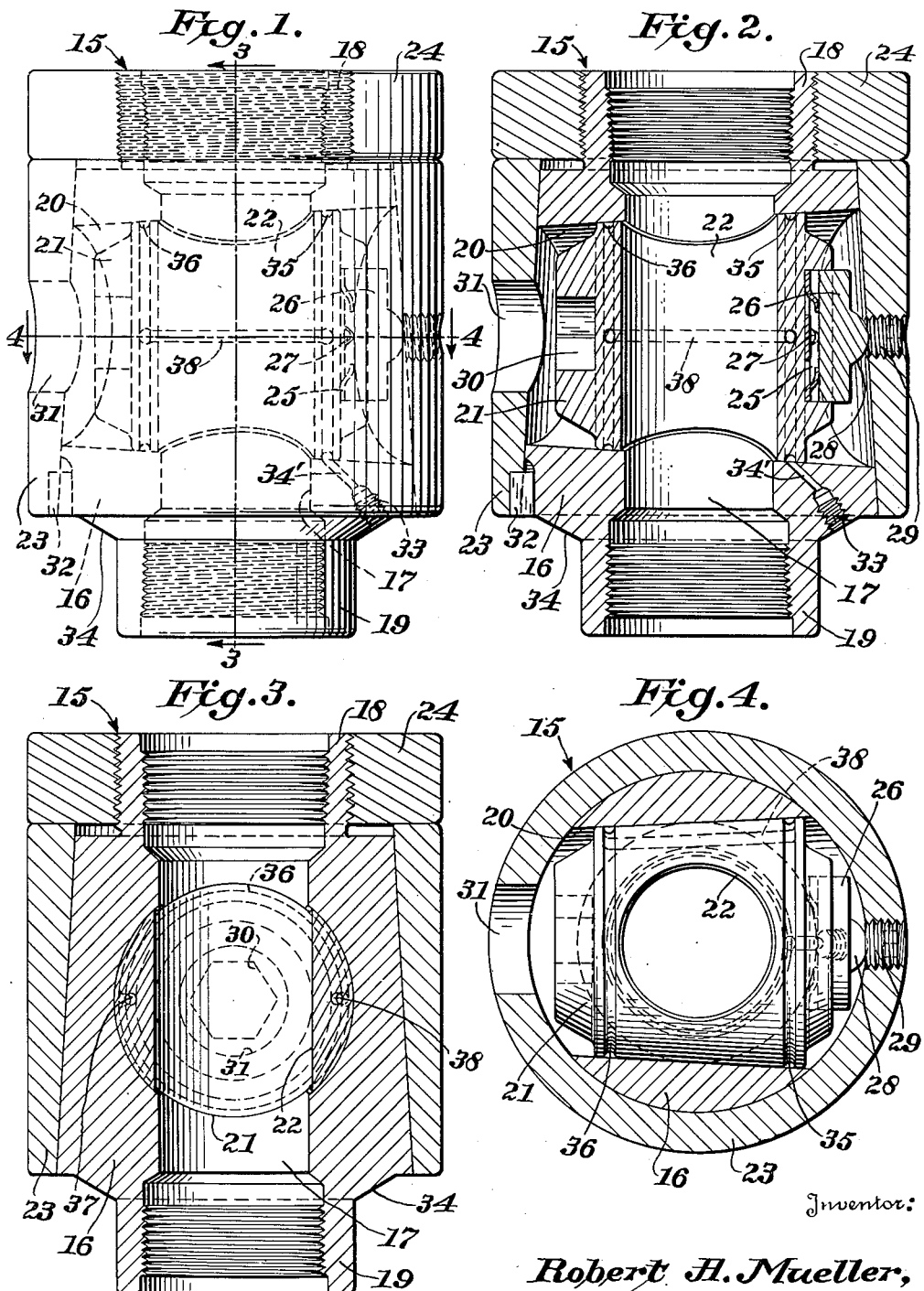
Inventor:
Robert H. Mueller,
By Cushman Darby & Cushman
Attorneys Patented Mar. 4, 1952

2,588,149

UNITED STATES PATENT OFFICE 2,588,149

VALVE

Robert A. Mueller, Houston, Tex., assignor to Gray Tool Company, Houston, Tex., a corporation of Texas Original application April 8, 1944, Serial No. 530,171, now Patent No. 2,442,548, dated June 1, 1948. Divided and this application February 26, 1945, Serial No. 579,763

6 Claims. (Cl. 251—91)

This invention relates to valves and has at its principal object the provision of a valve of compact structure capable of withstanding high pressures. Although the valve is a general application, it has particular value as a master flow control valve in oil well installations, such as disclosed in my copending application Serial No. 530,171, filed April 8, 1944, which has issued as Patent 2,442,548, dated June 1, 1948, of which the present application is a division.

A practical embodiment of the new valve is shown by way of example in the accompanying drawings, in which:

Figure 1 is a side elevation of the valve.

Figure 2 is a vertical section of the valve of Figure 1 on the axis of a plug which forms a part of the valve.

Figure 3 is a section on line 3—3 of Figure 1, and

Figure 4 is a section on line 4—4 of Figure 1.

Referring to the drawings, the valve generally indicated by the reference numeral 15 comprises a body 16 provided with a bore 17. The body includes end neck portions 18 and 19 of which the former is threaded interiorly and exteriorly and the latter is threaded interiorly. Intermediate the neck portions, the body is slightly conical on the axis of bore 17, tapering toward the neck 18.

Bore 17 is intersected by a conical valve seat 20 with which cooperates a mating plug 21 having a passage 22 registrable with the bore 17. The valve plug is entirely within the valve body when operatively disposed.

Reference numeral 23 designates a sleeve which is externally cylindrical but which is internally tapered as the body portion 16 and embraces the latter so as to tightly close the ends of the valve seat 20, the sleeve being held in place by a ring 24 threaded on the neck 18 and held in predetermined angular relation to the body by a key 32.

At its large end, the valve plug has an axial recess 25 in which is slidable a block 26 and a compression spring 27 is disposed between the block and the bottom of the recess. Externally, the block has a rounded bearing boss 28 which engages a socketed plug 29 threaded in the sleeve 23 without projecting outwardly of the sleeve. Spring 27 serves to seat the plug 21 with a force determined by the adjustment of the abutment plug 29. The small end of the valve plug is provided with a socket 30 engageable by a turning tool inserted through an opening 31 in the sleeve 23.

Reference numeral 33 designated a plug threaded in a conical portion 34 at the base of neck 19 and closing a lubricating duct 34' which extends to a peripheral lubricant groove 35 at the large end of plug 21, the groove 35 being connected with a groove 36 in the other end of the plug 21 by ducts in the form of bores 37 and 38. Ducts 37 and 38 terminate in grooves 35 and 36 and except where their ends terminate in the grooves the ducts are entirely within the plug and closed so that lubricant is passed from groove 35 to groove 36 without loss in all positions of the plug. Grooves 35 and 36 are opposite solid faces of the seat so as to be closed by the latter. Plug 33 is threaded in sufficiently so as not to obstruct the surface 34.

The valve as described is readily assembled and may be made of great strength so as to readily withstand oil well pressures, and its cylindrical side walls are entirely unobstructed.

The strength and compactness of the valve are of particular value in oil well installations, such as are disclosed in the parent case above mentioned, enabling it to be passed freely through drilling control equipment and to withstand any pressures encountered.

As stated at the outset, however, the new valve is not necessarily limited as to use. It is also susceptible of variation in the form and arrangement of its parts without departure from the invention as defined in the following claims.

I claim:

1. A valve comprising a tubular one piece body having a flow passage therethrough, said passage having a threaded portion at one end thereof to connect the valve into a flow tubing, a seat intersecting said passage, a rotary flow control plug in said seat of such length as to be entirely within said body, a sleeve embracing said body and plug and fixed against rotation with respect to said body, abutment provisions between said sleeve and plug for positioning the plug in said seat, and an opening in the sleeve at one end of the plug through which the latter may be manipulated.

2. A valve comprising a tubular one piece body having a flow passage therethrough, said passage having a threaded portion at one end thereof to connect the valve into a flow tubing, a seat intersecting said passage, a rotary flow control plug in said seat of such length as to be entirely within said body, an externally cylindrical sleeve embracing said body and plug and fixed against rotation with respect to said body, the exterior surface of said sleeve being free of any extensions beyond the same, abutment provisions between said sleeve and plug for positioning the plug in said seat, and an opening in the sleeve at one end of the plug through which the latter may be manipulated.

3. A valve comprising a tubular one piece body having a flow passage therethrough, said passage having a threaded portion at one end thereof to connect the valve into a flow tubing, said body having opposite openings laterally extending therethrough providing a conical seat intersecting said passage, a rotary flow control conical plug inserted through one of said openings into said seat of such length as to be entirely within said body, a sleeve embracing said body and plug and fixed against rotation with respect to said body, said sleeve having a smooth cylindrical exterior surface free of any extensions beyond the same, thrust provisions between the large end of the plug and said sleeve, and an opening in the sleeve at the small end of the plug through which the latter may be manipulated.

4. A valve comprising a body having a flow passage therethrough and having an exterior tapering in the longitudinal direction of said passage, a conical seat intersecting said passage, a rotary flow control conical plug in said seat and entirely within said body, a sleeve having a tapered interior engaged over said tapered exterior, retaining means for said sleeve threaded on said body at the small end of the body taper, thrust provisions between the large end of the plug and said sleeve, and an opening in the sleeve at the small end of the plug through which the latter may be manipulated, the small end of the plug having a formation engageable by a turning tool inserted through said opening.

5. A valve comprising a tubular one piece body having a longitudinal flow passage therethrough, said passage having threaded portions at the opposite ends thereof for connecting the valve into a tubing, a seat intersecting said passage, a rotary flow control plug in said seat, an externally cylindrical sleeve surrounding said body and plug, the external surface of said sleeve being free of any parts extending beyond the same, means for rigidly securing said sleeve to said body and against rotation with respect thereto, said sleeve having a lateral opening therein which is aligned with one end of said plug when said sleeve is secured to said body and through which said plug may be manipulated, said one end of said plug having a formation within the confines of said sleeve engageable by a turning tool inserted through said opening.

6. A valve comprising a tubular one piece body having a flow passage extending longitudinally therethrough, said passage having threaded portions at the opposite ends thereof for connecting the valve into a tubing, said body having laterally extending and aligned openings in its opposite walls forming a seat, a rotary flow control plug inserted laterally through one of said openings and into said seat, an externally cylindrical longitudinally extending sleeve surrounding said body and plug valve, means for rigidly securing said sleeve to said body and against rotation with respect thereto, said sleeve having a lateral opening therein which is aligned with one end of said plug when said sleeve is secured to said body and through which said plug may be manipulated, the wall of said sleeve at the opposite end of said plug valve being closed, said one end of said plug valve having a formation within the confines of said sleeve engageable by a turning tool inserted through said opening in said sleeve to manipulate said plug valve.

ROBERT A. MUELLER.

REFERENCES CITED

The following references are of record in the file of this patent:

UNITED STATES PATENTS

| Number | Name | Date |
|---|---|---|
| 885,526 | Ruppel | Apr. 21, 1908 |
| 1,646,708 | Richmond | Oct. 25, 1927 |
| 2,032,623 | Lewis | Mar. 3, 1936 |
| 2,329,981 | Church | Sept. 21, 1943 |
| 2,349,978 | Miller | May 30, 1944 |
| 2,354,864 | Kerr | Aug. 1, 1944 |
| 2,418,404 | Greenlee | Apr. 1, 1947 |